(12) United States Patent
Bowers et al.

(10) Patent No.: US 6,392,634 B1
(45) Date of Patent: May 21, 2002

(54) PORTABLE COMPUTER HAVING REVERSIBLE TRACKBALL/MOUSE DEVICE

(75) Inventors: David A. Bowers; Stephen A. Burke, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 08/330,234

(22) Filed: Oct. 27, 1994

Related U.S. Application Data

(63) Continuation of application No. 08/088,995, filed on Jul. 8, 1993.

(51) Int. Cl.[7] ................................................ G09G 5/08
(52) U.S. Cl. ..................................................... 345/163
(58) Field of Search ................................ 345/163, 164, 345/167, 168; D14/114

(56) References Cited

U.S. PATENT DOCUMENTS

| | | | | |
|---|---|---|---|---|
| 4,736,191 A | * | 4/1988 | Matzke et al. ............... | 345/157 |
| 4,939,508 A | * | 7/1990 | Lawrence et al. ........... | 345/167 |
| 5,049,863 A | * | 9/1991 | Oka ............................. | 345/163 |
| 5,063,289 A | * | 11/1991 | Jasinski et al. ............. | 250/221 |
| 5,171,978 A | * | 12/1992 | Mimlitch et al. ........... | 345/167 |
| 5,280,276 A | * | 1/1994 | Kwok ......................... | 345/163 |
| D356,788 S | * | 3/1995 | Mizusugi et al. .......... | D14/114 |
| 5,473,344 A | * | 12/1995 | Bacon et al. ................ | 345/163 |

FOREIGN PATENT DOCUMENTS

| WO | WO 9211623 | * | 7/1992 |
|---|---|---|---|

* cited by examiner

*Primary Examiner*—Richard Hjerpe
*Assistant Examiner*—R. Laneau
(74) *Attorney, Agent, or Firm*—Haynes and Boone, LLP

(57) ABSTRACT

A portable computer is provided with a combination trackball/mouse pointing device for controlling cursor movement on the computer screen. In one positional mode thereof, the device is removably inserted into a recess in the computer base housing and serves as an integrated trackball. In another positional mode thereof, the device is removed from the housing recess, vertically inverted, and rolled along a support surface adjacent the computer to serve as a mouse for screen cursor control purposes. Both the trackball and mouse functions of the device are carried out via the rotation of a ball carried by an outer housing portion of the device. In an alternate embodiment of the device, which does not require the vertical inversion of the device to switch between its mouse and trackball functions, the trackball function of the device is provided by a conventional touch pad structure exteriorly secured to the device housing on a side thereof opposite the exposed portion of the mouse ball.

27 Claims, 3 Drawing Sheets

PORTABLE COMPUTER HAVING REVERSIBLE TRACKBALL/MOUSE DEVICE

This application is a continuation of Ser. No. 08/088,995 filed Jul. 8, 1993.

BACKGROUND OF THE INVENTION

The present invention generally relates to computer apparatus and, in a preferred embodiment thereof, more particularly relates to pointing devices, such as trackballs and mice, for portable computers.

To control the movement of a cursor or other position highlighting indicia along its screen, a conventional portable computer is typically provided with a trackball device, either integral with the computer or of a "clip-on" variety. This conventional pointing device has a captively retained ball therein, a portion of which is exposed in a manner permitting the computer user to touch the ball and roll it in any selected direction corresponding to the desired movement direction of the screen cursor. Suitable mechanical-to-electrical transducing circuitry interconnected between the trackball and the computer screen appropriately correlates the movement of the screen cursor to the rotational speed and sense of the ball movement.

Both integral and clip-on trackball devices provide the primary advantage of compactness, permitting the portable computer to be used in cramped spaces, such as on the tray table on the back of an airline seat, without requiring any more horizontal support surface space than that required for the base portion of the computer housing.

However, for most portable computer users a conventional mouse, which may be rolled along a support surface adjacent the computer, is easier to use than a trackball as a pointing device and is therefore preferable. Accordingly, many portable computers are sold with mice instead of trackballs. Despite its ease of use, though, a computer mouse is not always usable in cramped spaces such as on airline seat trays. In such instances, the computer user is relegated to using a trackball pointing device, or the computer keyboard, to control the movement of a screen cursor.

It can be readily be seen from the foregoing that it would be desirable to provide a single computer pointing device that gives a portable computer user both the space compactness of a trackball and the ease of use of a mouse. It is accordingly an object of the present invention to provide such a pointing device.

SUMMARY OF THE INVENTION

In carrying out principles of the present invention, in accordance with a preferred embodiment thereof, a reversible trackball/mouse pointing device is provided for controllably moving a cursor image generated on the display screen of a computer. The pointing device comprises a support structure having a side, and a ball rollingly supported within the support structure and having a portion exposed on the side thereof.

The support structure is rotatable about an axis thereof between a first position in which the ball portion may be manually engaged and moved in a manner rotating the ball in a selected direction relative to the support structure, and a second position in which the ball portion may be positioned against a surface and the support structure moved along the surface in a manner causing the ball to be rotated by the surface in a selected direction relative to the moving support structure.

First means are provided for generating first and second output signals respectively indicative of the direction of rotation of the ball relative to the support structure about first and second reference axes, each of the first and second output signals having a directional sense.

Second means are provided for receiving the first and second output signals and responsively generating a third output signal useable to control the movement of the cursor image on the display screen and representing a directional component summation of the first and second output signals.

Third means, responsive to the movement of the support structure from one of the first and second positions thereof to the other of the first and second positions thereof, are provided for reversing the directional component of the third output signal associated with a selected one of the first and second output signals.

Accordingly, in its first position the pointing device is useable as a trackball, and in its second position the pointing device is useable as a mouse. In accordance with one aspect of the present invention, the support structure, in its first or trackball orientation, is removably insertable in an external recess formed in a housing portion of the computer in a manner such that the ball portion is exposed to manual contact by a user of the computer. To convert the pointing device from its trackball orientation to its mouse orientation, the device is simply removed from the external recess, vertically inverted, and placed first side down on a horizontal support surface adjacent the computer housing.

In a preferred embodiment of the pointing device the first and second means include an electronic circuit carried by the support structure and operatively coupled to the ball, and the third means include a mercury switch carried by the support structure and operatively coupled to the electronic circuit.

According to other aspects of the invention the support structure has outwardly projecting ribs on opposite side edge portions thereof, the ribs being slidably receivable in grooves formed in opposing side wall portions of the computer housing recess. The support structure has a first pair of pointer control buttons operatively disposed on its first side, and a second pair of pointer control buttons operatively disposed on its second side, and the computer housing recess has a bottom wall that protectively underlies the second pair of pointer control buttons when the support structure, in its trackball orientation, is inserted into the housing recess.

Representatively, the pointing device is operatively connected to the computer by means of a wire that extends from the support structure into the interior of the computer housing through an opening formed in an inner end wall of the housing recess, the aforementioned third output signal being transmitted to the computer through the wire. It will be appreciated that, if desired, the wire could be eliminated and the pointing device operatively coupled to the computer by a suitable IR or RF transmitter carried by the support structure.

In an alternate embodiment of the pointing device a conventional touch pad is mounted on the side of the support structure opposite the exposed mouse ball portion. The touch pad faces upwardly when the pointing device is operatively inserted, ball side down, into the housing recess and is used in lieu of the inverted trackball mode of the previously mentioned embodiment of the pointing device. Additionally, the directional component reversing portion of the previously mentioned third means are eliminated in this alternate embodiment of the pointing device.

DETAILED DESCRIPTION

Figure 1:
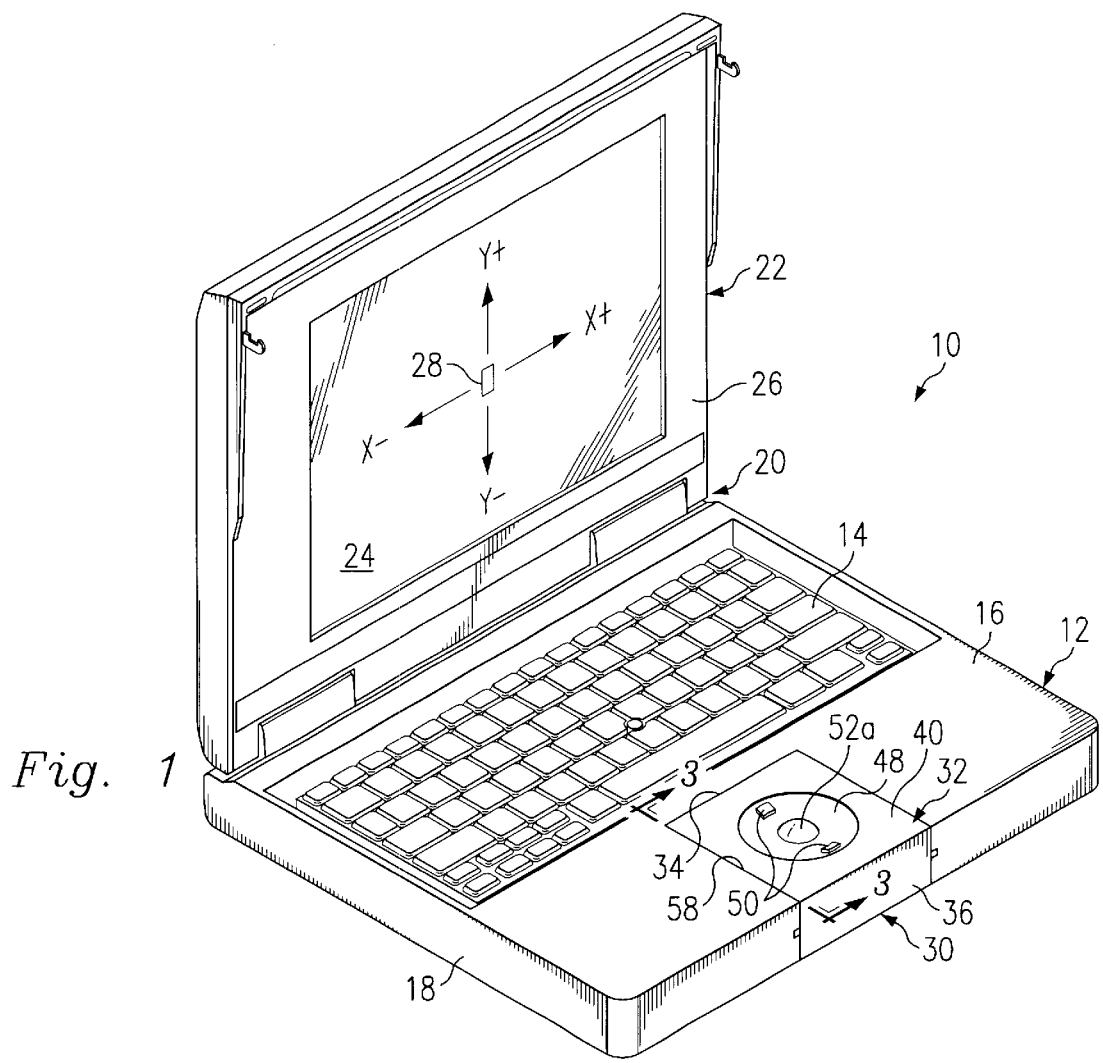
FIG. 1 is a simplified perspective view of a representative portable computer having incorporated therein a reversible trackball/mouse pointing device embodying principles of the present invention, the device being shown removably received in a recess in the computer base section and in its trackball orientation.

Perspectively illustrated in FIG. 1 is a representative portable notebook computer 10 having a generally rectangular housing base portion 12 with the usual keyboard 14 on its top side 16 rearwardly of its front side edge 18. Pivotally connected to the base portion 12, along its rear side edge 20, is a rectangular lid portion 22 of the computer which has a display screen 24 on its inner side 26. The lid portion 22 is pivotable between its illustrated, generally upright use position in which the screen 24 is exposed to view, and a closed storage and transport position (not illustrated) in which the lid portion extends across and covers the top side of the base portion 12.

During use of the computer 10 a cursor image 28 is formed on the screen 24 and may be moved about on the screen, to any selected position thereon, using a specially designed combination trackball/mouse pointing device 30 embodying principles of the present invention. As illustrated in FIGS. 1–4, pointing device 30 includes a support structure in the form of a generally rectangular housing 32 having front and rear ends 34 and 36, vertically oppositely facing first and second sides 38 and 40, and horizontally oppositely facing left and right side edges 42 and 44.

Side 38 of the pointing device 30 has a forwardly and inwardly sloped front end portion 38a with a pair of pointer select buttons 46 operatively disposed thereon. Side 40 of the pointing device 30 is essentially planar and has a generally spherically curved depression 48 formed therein with a diametrically opposite pair of pointer select buttons 50 being operatively disposed within the depression. A ball 52 is rollingly supported within the pointing device housing 32 and has a portion 52a exposed within the depression 48. For purposes later described, a pair of outwardly projecting ribs 54 are formed on the side edges 42,44 of the device housing 32 and longitudinally extend in front-to-rear directions thereon.

Figure 2:
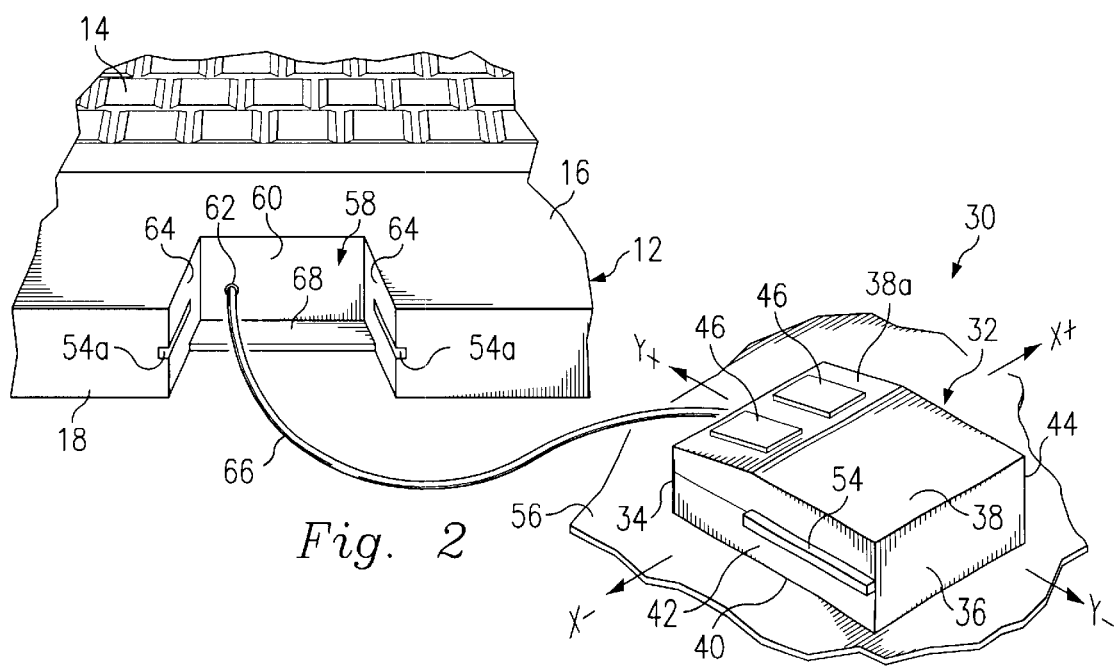
FIG. 2 is an enlarged scale simplified perspective view of a portion of the computer base section, with the device removed from the base section and being used in its vertical inverted mouse orientation.
Figure 3:
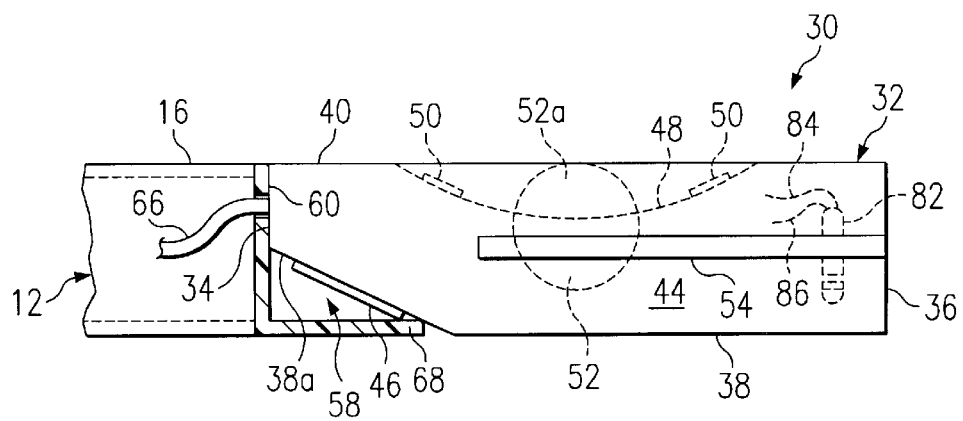
FIG. 3 is an enlarged scale simplified cross-sectional view through the computer base section taken along line 3—3 of FIG. 1.
Figure 4:
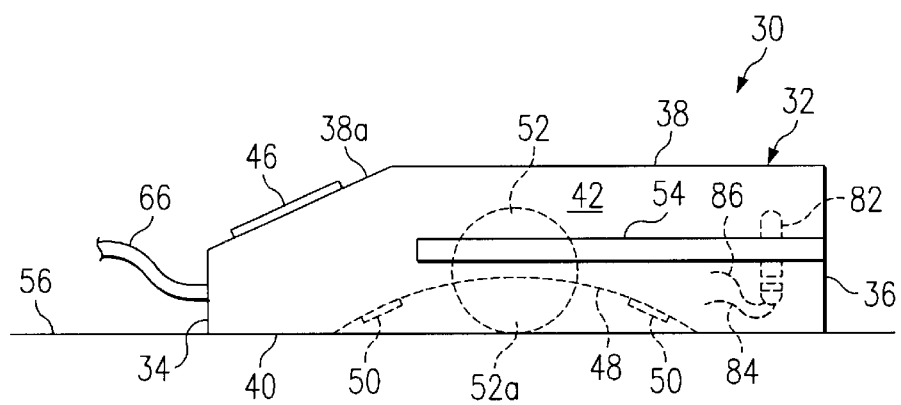
FIG. 4 is a simplified left side elevational view of the device in its mouse orientation as shown in FIG. 2.

The pointing device 30 is vertically invertible between a trackball orientation shown in FIGS. 1 and 3, and a mouse orientation shown in FIGS. 2 and 4. With the device 30 in its trackball orientation the housing side 40 faces upwardly, and with the device 30 in its mouse orientation the housing side 38 faces upwardly and the side 40 may be placed on a suitable horizontal support surface 56 adjacent the computer 10 (see FIG. 2).

As illustrated in FIGS. 1–3, a rectangular recess 58 is formed in the front side edge 18 of the computer base portion 12, in front of the keyboard 14, and is sized to removably receive the pointing device 30, front end first, in its trackball orientation. The recess 58 has an inner end wall 60 with a small circular opening 62 therein (see FIG. 2), and a pair of opposite side walls 64 having a pair of grooves 54a formed therein. Grooves 54a are configured to complementarily receive the housing ribs 54 when the pointing device 30, in its trackball orientation, is inserted into the recess 58.

A wire 66 extends through the end wall opening 62 and is connected at an inner end thereof to the operating components within the computer base 12, and at its outer end to the front end 34 of the pointing device 30. Electrical power from the computer is transmitted through the wire 66 to the pointing device 30, and cursor positional control signals from the pointing device 30 are transmitted to the computer through the wire 66. The pointing device 30 is removably installed on the computer base 12 by feeding the wire 66 into the interior of the computer base through the recess end wall opening 62 and then inserting the pointing device 30 into the recess 58 so that the ribs 54 are received in the grooves 54a. When the device 30 in its trackball orientation is operatively received in the recess 58, a bottom recess wall 68 (see FIGS. 2 and 3) extends beneath the sloping housing wall portion 38a and shields the pointer select buttons 46.

When the pointing device 30 is operatively disposed within the computer base portion recess 58 as shown in FIGS. 1 and 3, and the computer lid portion 22 is raised, the portion 52a of the pointing device ball 52 faces upwardly and is exposed generally at the top side 16 of the computer base portion 12. To reposition the cursor 28 on the display screen 24, the computer user simply touches the exposed ball portion 52a and moves it to roll the ball 52 in a selected direction relative to the device housing 32. For example, to move the cursor 28 vertically on the screen, along the indicated Y+,Y– screen axis (see FIG. 1), the ball 52 is rotated in the appropriate direction about the corresponding X+,X– reference axis of the pointing device 30 shown in FIG. 5 (i.e., toward or away from the display screen as viewed in FIG. 1).

For example, to vertically move the cursor 28 upwardly from its indicated FIG. 1 position, the ball 52 would be rotated in a counterclockwise direction as viewed in FIG. 3. Similarly, to vertically move the cursor downwardly from its FIG. 1 position the ball is rotated in a clockwise direction as viewed in FIG. 3. Rotation of the ball 52 about the X+,X– axis shown in FIG. 5 causes a corresponding rotation of a transducer roller 70 disposed within the device housing 32 and frictionally engaged by the ball 52. Rotation of the roller 70, via the operation of conventional transducer means, transmits an electrical output signal 72 from the roller 70 to an electronic circuit 74 disposed within the device housing 32. Reversal of the rotational direction of the roller 70 correspondingly reverses the polarity of the output signal 72.

Horizontal movement of the cursor 28 on the screen 24, along the X+,X– screen axis is achieved by rolling the ball 52 about the Y+,Y– device axis—leftwardly (as viewed in FIG. 1) to move the cursor to the left on the screen, and rightwardly to move the cursor to the right on the screen. This rotation of the ball 52 about the Y+,Y– device axis causes a corresponding rotation of a transducer roller 76 (see FIG. 5) disposed within the device housing 32, perpendicularly to the roller 70, and frictionally engaged by the ball 52. Rotation of the roller 72 transmits an electrical output signal 78 to the electronic circuit 74. Reversal of the rotational direction of the roller 76 about the Y+,Y− device axis correspondingly reverses the polarity of the output signal 78.

In a conventional manner, the electronic circuit 74 utilizes the received signals 72 and 78 to responsively output an electrical signal 80 which is indicative of the net rolling movement direction of the ball 52. More specifically, the signals 72,78 are indicative of perpendicular vector components of the rolling motion direction of the ball 52 and are summed by the circuit 74 to generate the combinative directional output signal 80. Signal 80 is transmitted, via the wire 66, to display electronics within the computer base portion 12 that correspondingly move the cursor 28 on the screen 24 in a manner precisely "tracking" the net rolling movement direction of the ball 52. When the cursor has been moved to a desired new location on the display screen, for example to an icon thereon, either or both of the pointer buttons 50 may be manually depressed in a conventional manner to "select" an available location or function on the screen.

To use the pointing device 30 in its mouse orientation the device is pulled out of the recess 58, vertically inverted by rotating it 180° about its Y axis (see FIG. 2) so that the device housing side 38 faces upwardly, and then placing the now inverted device 30 on the horizontal support surface 56. In this mouse orientation of the device, the downwardly projecting ball portion 52a (see FIG. 4) frictionally engages the support surface 56 in a manner such that translation of the device 30 along surface 56 rolls the ball 52 relative to the device housing 32 and correspondingly rotates the rollers 70 and 76 to responsively generate the electrical output signals 72 and 78 (see FIG. 5) and the resultant signal 80.

Rightward translation of the device 30 along its X axis (i.e., in the X+ direction of the device) over the support surface 56 rightwardly moves the cursor 28 along the display screen 24 in the X+ screen direction. In a similar manner, leftward translation of the device 30 along its X axis (i.e., in the X− direction of the device) leftwardly moves the cursor 28 along the display screen 24 in the X− screen direction. The pointer select buttons 46 are used in the same manner as the previously described buttons 50 when the device 30 is in its mouse orientation.

It should be noted that rightward translation of the device 30 in its vertically inverted mouse orientation causes the ball 52 to be rolled relative to the device housing 32 in the same direction as when the ball is rightwardly rolled with the device 30 is in its previously described trackball orientation as shown in FIGS. 1 and 3. Similarly, leftward translation of the device 30 in its vertically inverted mouse orientation causes the ball 52 to be rolled relative to the device housing 32 in the same direction as when the ball is leftwardly rolled with the device 30 in its trackball orientation.

This correspondence in rolling direction of the ball 52 relative to the device housing 32 when the device is in either of its trackball and mouse orientations is, however, not maintained when the device 30 is translated over the support surface 56 along the Y axis of the device. Such noncorrespondence in ball rotational direction is best illustrated by comparing FIGS. 3 and 4.

For example, with the device in its trackball orientation (FIG. 3), to move the cursor 28 upwardly on the display screen 24, the ball 52 would be rolled toward the front end 34 of the device housing 32 (i.e., toward the screen 24). When the device 30 in its vertically inverted mouse orientation is forwardly moved (i.e., to the left in FIG. 4) along the support surface 56, as a conventional mouse would be to upwardly move the cursor on the screen, the ball 52 is rolled toward the rear end 36 of the device housing 32. This reversed rolling of the ball 52 relative to the device housing 32 thus causes the output signal 72 to be correspondingly reversed relative to the Y axis signal necessary to produce the desired upward movement of the cursor.

To compensate for this Y axis signal reversal when the device 30 is in its vertically inverted mouse orientation, which would otherwise require that the device be moved rearwardly to move the cursor up on the screen, and forwardly to move the cursor down on the screen (i.e., exactly opposite from the normal Y axis movement of a conventional mouse), the present invention uniquely provides mode sensing means that representatively include a mercury switch 82. These mode sensing means detect the vertical inversion of the device 30 from its trackball orientation to its mouse orientation and responsively reverse the Y axis signal used in combination with the X axis signal to generate the combined cursor position signal 80 transmitted to the computer, thereby compensating for the vertical inversion of the device 30 from its trackball orientation to its mouse orientation. In this manner when the device 30 is in its mouse orientation forward movement of the device moves the cursor upwardly on the screen, and when the device 30 is rearwardly moved the cursor is moved downwardly on the screen.

Figure 5:
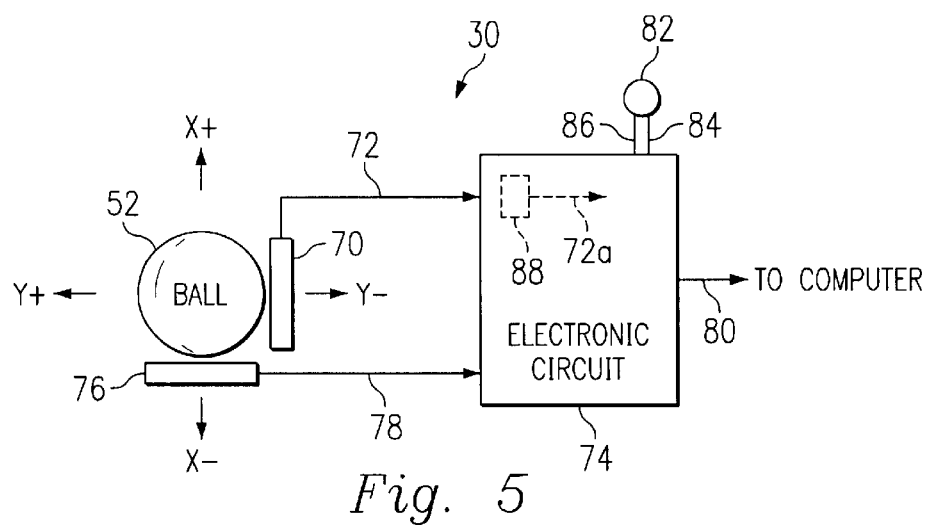
FIG. 5 is a highly schematic circuit diagram illustrating a representative manner in which cursor positional control signals are transmitted to the computer from the reversible trackball/mouse device.

Turning now to the highly schematic diagram in FIG. 5, the mercury switch 82 has a pair of electrical leads 84 and 86 that are operatively coupled to the electronic circuit 74 and to a signal inverter portion 88 thereof. When the device 30 is in its trackball orientation the X and Y axis signals 78,72 received by the circuit 74 are, as previously mentioned, directly combined and used to generate the cursor control signal 80 transmitted to the computer. However, when the device 30 is vertically inverted to its mouse orientation the corresponding vertical inversion of the mercury switch 82 is used to route the incoming Y axis signal 72 to the inverter 88 which responsively outputs a reversed polarity signal 72a that is combined with the incoming X axis signal 78 to form the output signal 80. Accordingly, the X axis directional component of the signal 80 is unchanged, but its Y axis directional component is reversed to compensate for the reversal of Y axis ball rotation relative to the device housing 32 when the device 30 is in its mouse orientation.

It can be readily seen from the foregoing that the present invention conveniently provides a portable computer pointing device that gives the computer the compactness of a built-in trackball where computer use space is limited, in addition to the often preferred "feel" of a separate mouse when more operating space is available. The pointing device 30 is of a relatively simple construction and is quite easy to use in either of its positional modes, giving the same feel and operational direction of either a built-in trackball or separate mouse as the case may be.

While the combination trackball/mouse pointing device 30 has been representatively illustrated as using the wire 66 as the means for transmitting cursor control signals from the device to the computer, it will readily be appreciated by those skilled in this art that other control signal transmitting means, such as IR or RF signals transmitted from the device, could be used in place of the wire if desired. This modification is illustrated in simplified form in FIG. 6 in which the wire 66 and its associated housing opening 62 have been eliminated and a representative IR or RF signal 90 is being transmitted, by means of conventional circuitry (not illustrated) within the pointing device housing 32, to conventional receiving circuitry (also not illustrated) within the computer housing base portion 12.

Additionally, since the wire 66 is connected to the front end 32 of the device housing 32, the vertical inversion of the device is effected by rotating it about its Y axis, and the signal inverting means 88 is used in conjunction with the Y axis output signal 72. However, it will be appreciated that if the wire 66 was instead connected to one of the side edges 42,44 of the device housing 32 such vertical inversion would be effected by rotating the device about its X axis, and the signal inverting means 88 would be utilized, under the control of the mercury switch 82 or other mode sensing means, in conjunction with the X axis signal 78.

Figure 7:
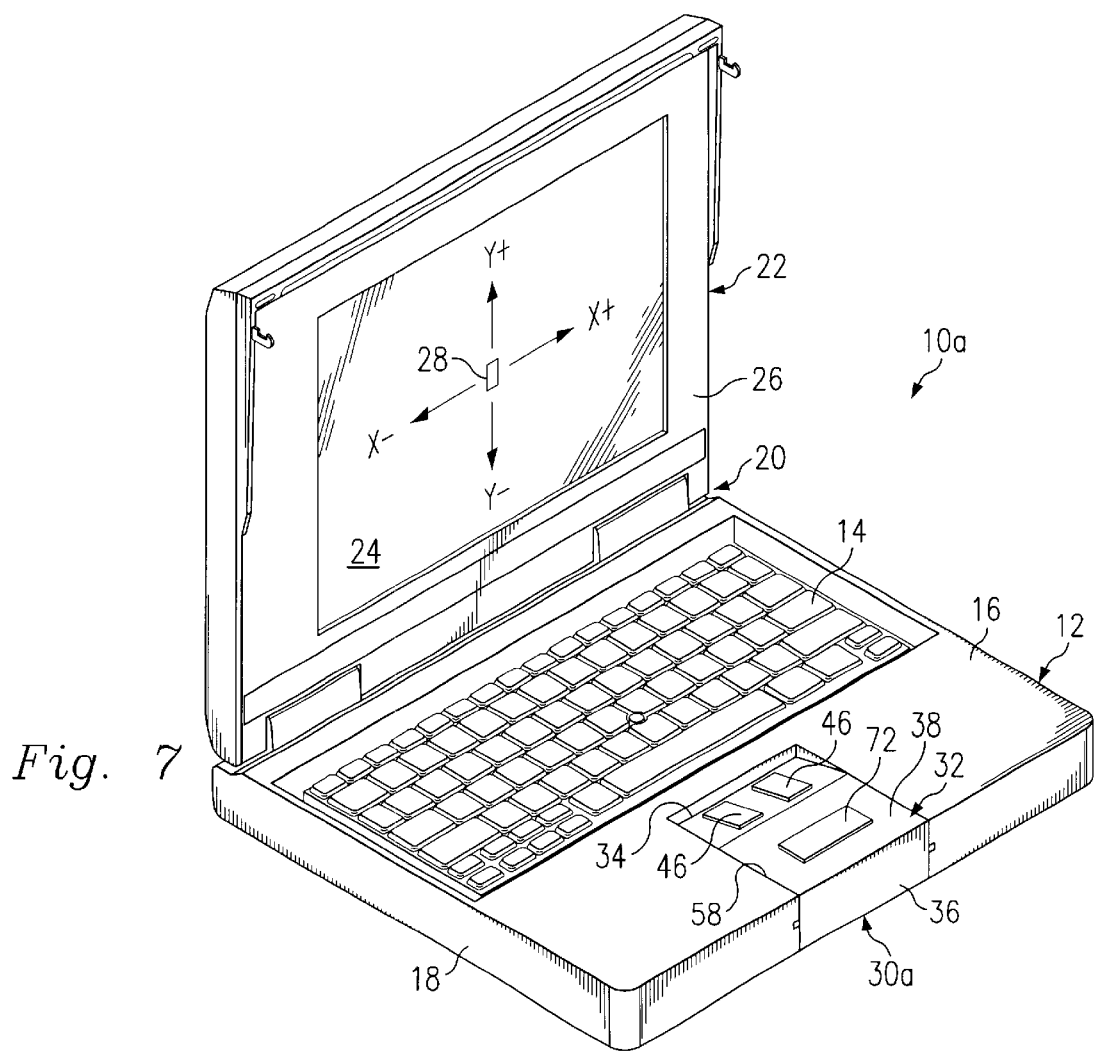
FIG. 7 is a view similar to that in FIG. 1 but illustrating instead an alternate embodiment of the pointing device in which a touch pad is incorporated therein in place of its trackball structure.

An alternate embodiment 10*a* of the computer 10 is illustrated in FIG. 7 and is provided with a modified pointing device 30*a* disposed in its trackball orientation in which it is removably received in the housing recess 58. The pointing device 30*a* is substantially identical to the previously described pointing device 30 with the exception that the ball 52 (see FIG. 3) does not project through the device housing side 38, and is not used to provide the modified pointing device 30*a* with its track ball function.

Figure 6:
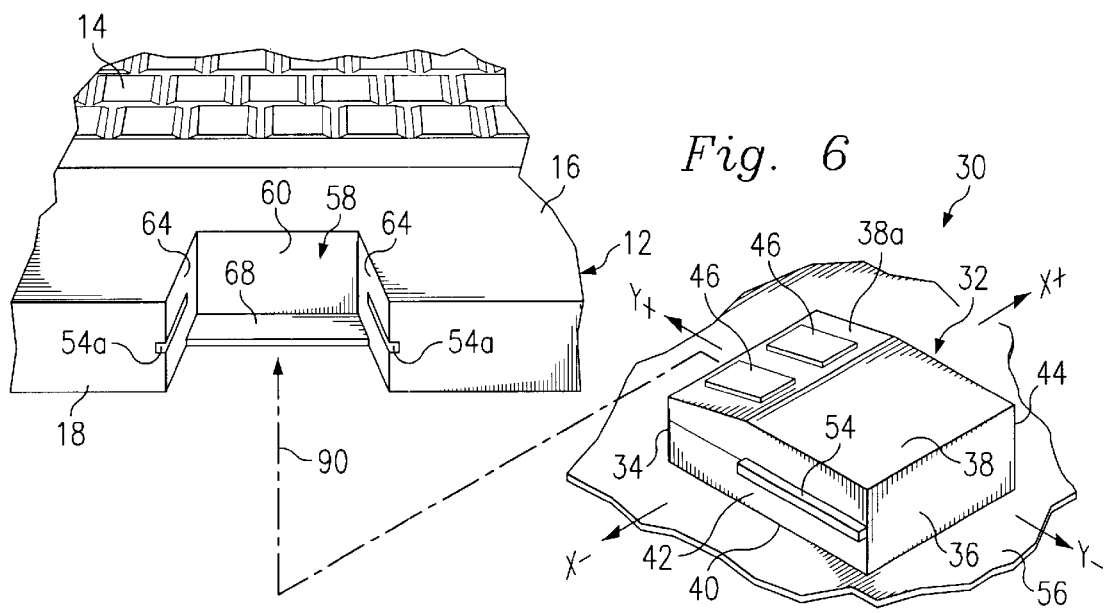
FIG. 6 is a view similar to that in FIG. 2 but illustrating instead a wireless version of the pointing device.

Instead, a conventional touch pad structure 92 is mounted on the top side 38 of the device housing 32 behind the two pointer select buttons 46 thereon. Touch pad 92 is electronically coupled to the pointing device and functions in a conventional manner. Specifically, the user places a finger on the pad and then moves the finger along the pad to effect movement of the cursor 28 in a corresponding direction along the screen 24. Like the previously described pointing device 30, the modified pointing device 30*a* in its orientation shown in FIG. 7 provides a trackball function, and when removed from the housing recess 58 may be rolled along a horizontal support surface to provide a mouse function. The pointing device 30*a* may be operatively associated with the balance of the computer by means of a wire (as shown in FIG. 2), or via a wireless signal 90 as shown in FIG. 6. As will be appreciated, the alternate embodiment 30*a* of the pointing device need not be provided with the previously described mode sensing means for sensing a vertical inversion of the device housing 32.

The foregoing detailed description is to be clearly understood as being given by way of illustration and example only, the spirit and scope of the present invention being limited solely by the appended claims.

What is claimed is:

1. For use with a computer having a display screen upon which a movable cursor image may be generated, a pointing device useable to controllably move the cursor image on the display screen, said pointing device comprising:

an invertable support structure having a first exterior side and a second exterior side opposite said first side, each of said first and second exterior sides including a shaped portion, the shaped portion of the first side being a sloped portion and the shaped portion of the second side being a dish-shaped depression;

a first pair of pointer select buttons operatively disposed on and extending from the sloped portion of said first side;

a second pair of pointer select buttons operatively disposed to extend from within said dish-shaped depression;

a ball rollingly supported within said dish-shaped depression of said support structure and having a portion exposed on said second side thereof;

said support structure being rotatable about an axis thereof between a first position in which said ball portion may be manually engaged and moved in a manner rotating said ball in a selected direction relative to said support structure, and a second position in which said ball portion may be positioned against a surface and the support structure moved along the surface in a manner causing said ball to be rotated by the surface in a selected direction relative to the moving support structure;

first means for generating first and second output signals respectively indicative of the direction of rotation of said ball relative to said support structure about first and second reference axes, each of said first and second output signals having a directional sense;

second means for receiving said first and second output signals and responsively generating a third output signal useable to control the movement of the cursor image on the display screen and representing a directional component summation of said first and second signals; and third means, responsive to the movement of said support structure from one of said first and second positions thereof to the other of said first and second positions thereof, for reversing the directional component of said third output signal associated with a selected one of said first and second output signals.

2. The pointing device of claim 1 wherein:

said first and second positions of said support structure are vertically inverted relative to one another, and said first and second reference axes are perpendicular to one another.

3. The pointing device of claim 1 wherein:

said pointing device is operatively coupled to the computer by a wire, and said second means are operative to transmit said third output signal through said wire.

4. The pointing device of claim 1 wherein:

said third output signal is a wireless signal.

5. The pointing device of claim 4 wherein:

said third output signal is an IR signal.

6. The pointing device of claim 4 wherein:

said third output signal is an RF signal.

7. The pointing device of claim 2 wherein:

said first means include a transverse pair of rollers frictionally engaged by said ball, and said first and second output signals are electric output signals and are generated in response to rotation of said rollers by said ball, said second means include electronic circuit means for receiving said first and second electric output signals and responsively generating said third output signal in the form of an electric output signal, and said third means include a signal inverter incorporated in said electronic means, and a mercury switch carried by said support structure for vertical inversion therewith and operative to couple said selected one of said first and second electrical output signals to said signal inverter when said support structure is moved from said one of said first and second positions thereof to said other of said first and second positions thereof.

8. Computer apparatus comprising:

a computer including a housing and a display screen upon which a movable cursor image may be generated; and an invertable combination trackball/mouse pointing device, operatively associated with said computer, for controllably moving said cursor image on said display screen, said pointing device including:

a support structure having a first exterior side and a second exterior side opposite said first side, each of said first and second sides including a shaped portion, the shaped portion of the first side being a sloped portion and the shaped portion of the second side being a dish-shaped depression, a first pair of pointer select buttons operatively disposed on and extending from the sloped portion of said first side, a second pair of pointer select buttons operatively disposed to extend from within said dish-shaped depression, a ball rollingly carried within said dish-shaped depression of said support structure and having a portion exposed on said second side thereof, said support structure being rotatable between a trackball orientation in which said ball portion may be manually engaged and moved in a manner rolling said ball in a selectively variable direction relative to said support structure, and a mouse orientation in which said ball portion may be positioned against a surface and said support structure moved along the surface in a manner causing said ball to be rotated in a selectively variable direction relative to said support structure, signal generating means, responsive to a rolling of said ball relative to said support structure, for generating an output signal indicative of the rolling direction of said ball relative to said support structure, said output signal being useable to controllably move said cursor image on said screen and having first and second directional components respectively indicative of the rolling movement of said ball about first and second mutually perpendicular axes, and mode sensing means for detecting rotation of said support structure from one of said trackball and mouse orientations thereof to the other of said trackball and mouse orientations thereof and responsively reversing the directional sense of one of said directional components of said output signal.

9. The computer apparatus of claim 8 wherein:

said support structure is rotatable between said trackball and mouse orientations thereof generally about a reference axis extending through said support structure, one of said first and second mutually perpendicular axes is generally parallel to said reference axis, and the output signal directional component reversed by said mode sensing means is indicative of rotation of said ball relative to said support structure about the other of said mutually perpendicular axes.

10. The computer apparatus of claim 8 wherein:

said housing has an external recess therein, and said support structure, in said trackball orientation thereof, is removably insertable into said recess in a manner exposing said first side of support structure on said housing.

11. The computer apparatus of claim 10 wherein:

said housing has a top side surface, and said first side of said support structure faces upwardly when said support structure, in said trackball orientation thereof, is inserted into said recess.

12. The computer apparatus of claim 8 wherein:

said pointing device is operatively associated with said computer by a wire extending between said housing and said support structure, said output signal is an electrical signal, and said signal generating means are operative to transmit said output signal to said computer through said wire.

13. The computer apparatus of claim 7 wherein:

said output signal is a wireless signal.

14. The computer apparatus of claim 13 wherein:

said output signal is an IR signal.

15. The computer apparatus of claim 13 wherein:

said output signal in an RF signal.

16. The computer apparatus of claim 11 wherein:

said signal generating means include an electronic circuit carried by said support structure and operatively coupled to said ball, and said mode sensing means include a mercury switch carried by said support structure and operatively coupled to said electronic circuit.

17. A portable computer comprising:

a housing base portion having a top side and an external recess opening upwardly through said top side;

a housing lid portion secured to said housing base portion for pivotal movement relative thereto between an open position in which said lid portion is upwardly angled relative to said base portion, and a closed position in which said lid portion extends across and covers said top side of said base portion, said lid portion having an inner side;

a display screen, disposed on said inner side of said lid portion, upon which a movable cursor image may be generated; and an invertable combination trackball/mouse pointing device for controllably moving said cursor image on said display screen, said pointing device including:

a hollow device housing having oppositely facing first and second exterior sides, each of said first and second exterior sides including a shaped portion, the shaped portion of the first side being a sloped portion and the shaped portion of the second side being a dish-shaped depression, a first pair of pointer select buttons operatively disposed on and extending from the sloped portion of said first side, a second pair or pointer select buttons operatively disposed to extend from within said dish-shaped depression, a ball rollingly supported within said dish-shaped depression of said device housing and having a portion exposed on said second side of said device housing, said device housing being vertically invertable between a trackball orientation in which said first side of said device housing faces downwardly and said ball portion may be manually engaged and moved in a manner rolling said ball in a selectively variable direction relative to said device housing, and a mouse orientation in which said first side of said device housing faces upwardly and said ball portion may be positioned against a horizontal support surface and said device housing moved along the horizontal support surface in a manner causing said ball to be rotated by the support surface in a selectively variable direction relative to said device housing, said device housing, in said trackball orientation thereof, being removably insertable into said housing base portion recess in a manner such that, with said housing lid portion in said closed position thereof, said ball portion is exposed generally at said top side of said housing base portion, signal generating means, responsive to a rolling of said ball relative to said device housing, for generating an output signal indicative of the rolling direction of said ball relative to said device housing, said output signal being useable to controllably move said cursor image on said display screen and having first and second directional components respectively indicative of the rolling movement of said ball about first and second mutually perpendicular axes, and mode sensing means for detecting the vertical inversion of said device housing from one of said trackball and mouse orientations thereof to the other of said trackball and mouse orientations thereof and responsively reversing the directional sense of one of said directional components of said output signal.

18. The portable computer of claim 17 wherein:

said portable computer is a notebook computer.

19. The portable computer of claim 17 wherein:

said external recess has a pair of horizontally facing opposite side walls with grooves formed therein, and said device housing has a pair of opposite side edge portions with outwardly projecting ribs formed thereon, said ribs being configured to be slidably received in said grooves when said device housing is operatively inserted into said external recess.

20. The portable computer of claim 17 wherein:

said external recess has an inner end wall with an opening therein, said pointing device is operatively connected to said housing base portion by a wire having an inner end portion movably extending through said end wall opening, and an outer end portion connected to said device housing, and said signal generating means are operative to transmit said output signal to said computer through said wire.

21. The portable computer of claim 17 wherein:

said output signal is a wireless signal.

22. The portable computer of claim 21 wherein:

said output signal is an IR signal.

23. The portable computer of claim 21 wherein: said output signal is an RF signal.

24. The portable computer of claim 17 wherein said external recess has a partial bottom wall that protectively underlies said sloped portion of said first side and protects said first pair of pointer select buttons when said device housing is in said trackball orientation mounted in said external recess.

25. The portable computer of claim 17 wherein:

said signal generating means include an electronic circuit carried by said device housing and operatively coupled to said ball, and said mode sensing means include a mercury switch carried by said device housing and operatively coupled to said electronic circuit.

26. Computer apparatus comprising:

a housing having an external recess therein;

a display screen upon which a movable cursor image may be generated; and a pointing device for controllably moving said cursor image on said display screen, said pointing device including:

an invertable support structure having opposite first and second exterior sides and being removably insertable into said external recess for movement with said housing, each of said first and second exterior sides including a shaped portion, the shaped portion of the first side being a sloped portion, and the shaped portion of the second side being a dish-shared depression, a first pair of pointer select buttons operatively disposed on and extending from the sloped portion of said first side, a second pair of pointer select buttons operatively disposed to extend from within said dish-shaped depression, a ball rollingly carried within said dish-shaped depression of said support structure and having a portion exposed on said second side thereof, said ball portion, when said pointing device is removed from said recess being positionable against a support surface and rollable relative to said support structure in response to translation of said support structure along the support surface, and first signal generating means, responsive to a rolling of said ball relative to said support structure, for generating a first output signal indicative of the rolling direction of said ball relative to said support structure, said first output signal being useable to controllably move said cursor image on said display screen.

27. The computer apparatus of claim 26 wherein:

said support structure is removably insertable into said recess in a manner exposing said first side of said support structure to manual contact by a user of said computer apparatus, and said computer apparatus further comprises a touch pad externally mounted on said first side of said support structure, and second signal generating means, responsive to manual contact and movement along said touch pad, for generating a second output signal indicative of the direction of manual movement along said touch pad, said second output signal being useable to controllably move said cursor image on said display screen.

* * * * *